US012643340B2

(12) United States Patent
Kraus

(10) Patent No.: US 12,643,340 B2
(45) Date of Patent: Jun. 2, 2026

(54) AUTOMATED ROTARY IMAGE GENERATION

(71) Applicant: Cole W. Kraus, Wakefield, MA (US)

(72) Inventor: Cole W. Kraus, Wakefield, MA (US)

( * ) Notice: Subject to any disclaimer, the term of this patent is extended or adjusted under 35 U.S.C. 154(b) by 678 days.

(21) Appl. No.: 18/094,081

(22) Filed: Jan. 6, 2023

(65) Prior Publication Data

US 2023/0226845 A1 Jul. 20, 2023

Related U.S. Application Data

(60) Provisional application No. 63/297,797, filed on Jan. 10, 2022.

(51) Int. Cl.
*B44D 3/22* (2006.01)
*B44D 2/00* (2006.01)

(52) U.S. Cl.
CPC *B44D 3/22* (2013.01); *B44D 2/00* (2013.01)

(58) Field of Classification Search
CPC .......... A63H 13/20; A63H 33/26; B43L 11/00
See application file for complete search history.

(56) References Cited

U.S. PATENT DOCUMENTS 2,192,476 A * 3/1940 Granville .................. A63F 9/14 40/426
3,387,393 A * 6/1968 Musser .................. G09B 27/02 446/136
3,468,032 A * 9/1969 Smith ..................... B43L 11/00 33/27.11
3,510,949 A * 5/1970 Christy .................. A63H 33/22 401/209
4,369,579 A * 1/1983 Mizoule .................. B43L 13/00 33/18.1
4,441,256 A * 4/1984 Cummings ............. B43L 11/00 33/27.11
4,825,556 A * 5/1989 Goldfarb ................ B43L 11/08 33/18.1

OTHER PUBLICATIONS

Schmidt, Wayne; "DIY Drawing Machine That Draws In Sand", 2020; https://www.youtube.com/watch?v=Cs5GuFEjZlg (Year: 2020).*
Screenshots from Schmidt, "DIY Drawing Machine That Draws In Sand" (Year: 2020).*

* cited by examiner

*Primary Examiner* — David P Angwin
*Assistant Examiner* — Bradley S Oliver
(74) *Attorney, Agent, or Firm* — Armis IP Law, LLC

(57) ABSTRACT

A rendering device forms a rotary pattern in a granular medium using a rotating arm having a distal end and a proximate end, where the distal end defines an outer radius and the proximate end defines an inner radius of a circular planar medium with a thin sand layer. A motor attached to the rotating arm for rotation about a center axis, and a spur gear rotationally attaches to the proximate end. An elongated rendering member pivotally attaches between the distal end and a radial location on the spur gear, where the elongated member has a varying length based on a rotation of the spur gear. A magnetic guide element is disposed on the elongated rendering member beneath the planar sand platform, and is in communication with a metal rendering element for traversing a path through a rendering medium by magnetically following the guide element underneath.

14 Claims, 7 Drawing Sheets

AUTOMATED ROTARY IMAGE GENERATION

RELATED APPLICATIONS

This patent application claims the benefit under 35 U.S.C. § 119(e) of U.S. Provisional Patent App. No. 63/297,797, filed Jan. 10, 2022, entitled "AUTOMATED ROTARY IMAGE GENERATION," incorporated herein by reference in entirety.

BACKGROUND

Sand and similar granular substances have provided a medium for visual and artistic expression for centuries. Indeed, granular substances fulfill both structural and aesthetic ends of many human endeavors. Modern availability of low cost molding/3-Dimensional (3-D) printing and electronic motor control have enabled motorized "sand art" offerings which utilize the near fluid-like properties of sand and similar granular substances in real-time manipulation for ongoing and dynamic patterning of the granular medium.

SUMMARY

An automated manipulation device for a granular material draws a rendering element through a layer of the granular material for forming a cyclic offset pattern a tabletop or floor mounted enclosure. A concealed electromechanical apparatus drives a magnetic follower element through the granular material in a path driven by a pivot on an eccentric rotation of a spur gear circumferentially driven around a circular enclosure. The electromechanical apparatus lies beneath a surface on which the magnetic follower is driven through the granular layer for displacing the granular substance on the path. Continual operation drives rotation of the spur gear and related mechanism lending a dynamic appearance to the constantly changing layer of granular material as the magnetic follower takes a repeating but offset series of elliptical and eccentric movements. Varied eccentric orbits are therefore defined by pivot positions in the spur gear, and multiple positions of the magnetic guide element allow selection of different paths.

Configurations herein are based, in part, on the observation of the popular appeal of sand and granular substances as a rendering medium for novelty and functional uses. As with the novelty and recreational uses, some conventional approaches to granular mediums rely on manual manipulation by an artist or operator. Other conventional uses employ digital and/or pixelated access using a grid or discrete addressing scheme. Accordingly, configurations here substantially overcome the shortcoming of conventional approaches using an electromechanical device for continued rendering of a granular or fluidic path through a planar arrangement of the granular rendering substance, sized and powered suitably for a domestic tabletop or floor deployment. In contrast to digital mediums, the pattern emerges from a continuous path driven by analog mechanisms for smooth patterns with a slight cyclic offset for forming a visible series of waves or ridges.

In operation, the rendering device forms a rotary pattern in a granular medium using a rotating arm having a distal end and a proximate end, where the distal end defines an outer radius and the proximate end defines an inner radius of a circular planar medium with a thin sand layer. A motor attaches to the rotating arm for rotation about a center axis, and a spur gear rotationally attaches to the proximate end.

An elongated rendering member pivotally attaches between the distal end and a radial location on the spur gear, where the elongated rendering member has a varying length based on a rotation of the spur gear. A magnetic guide element is disposed on the elongated rendering member beneath the planar sand platform, and is in communication with a metal rendering element for traversing a path through a rendering medium by magnetically following the guide element underneath.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
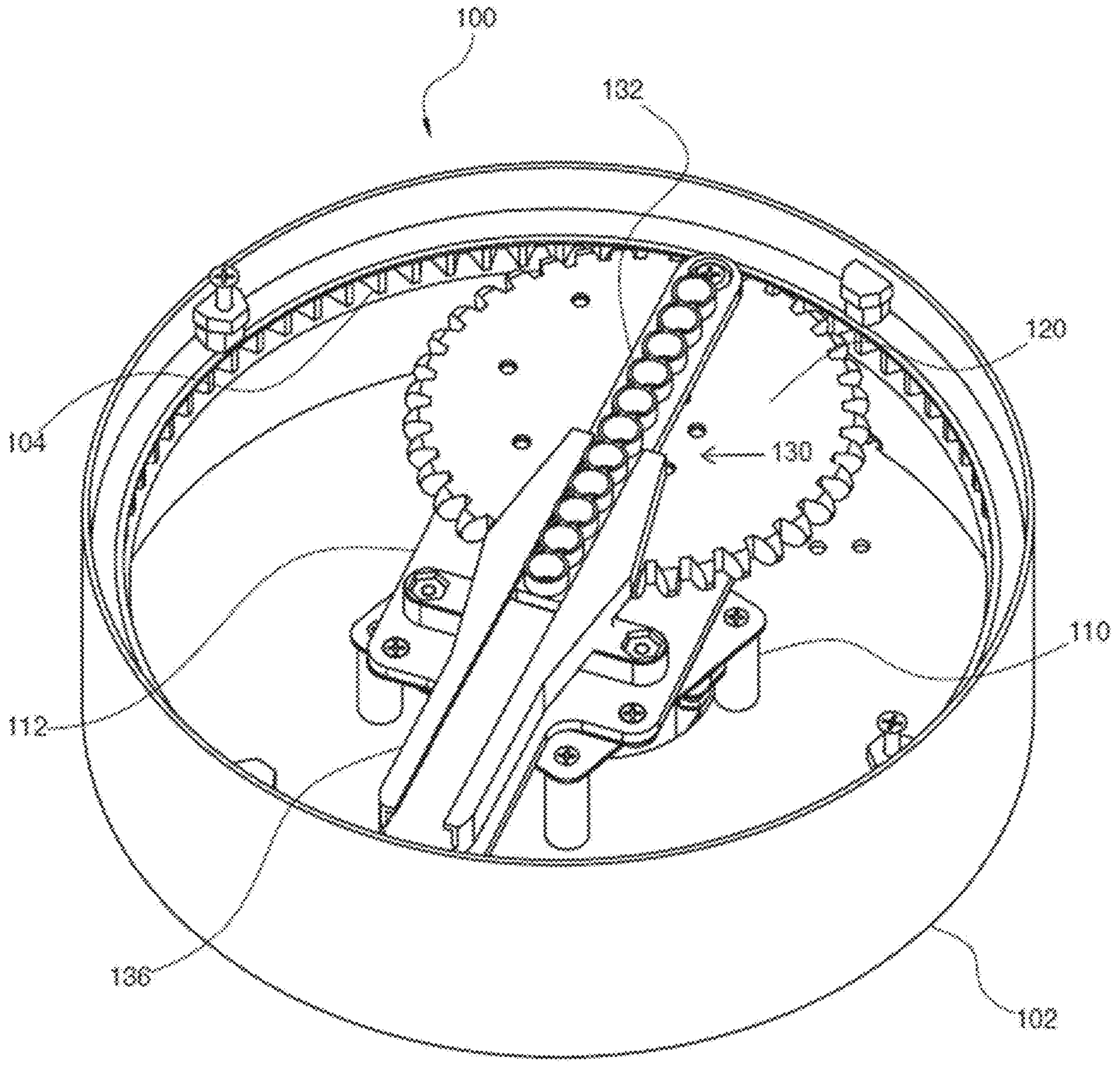
FIG. 1 is a perspective view of the rotary image device as disclosed herein.

In the example configurations described below, a rotationally driven rendering device for displacing a granular substance in a cyclic rotary path includes a circular enclosure having a series of perimeter teeth around a circumference of the enclosure, a motor, and a rotating arm rotationally driven by the motor. In appearance, the rendering device is a circular, tabletop assembly with a layer of sand through which a drawing element passes, driven by a magnetic element beneath the sand platform. A motor operates on 110/120 VAC household power for driving a spur gear rotationally attached to a proximate end of the rotating arm at a center of the spur gear, such that the spur gear is adapted to engage the perimeter teeth as the motor drives the rotating arm at a modest (2 or 3 rpm) speed. A pivot linkage on the rotating arm is pivotally engaged with an elongated rendering member at a radial point on the spur gear, where the radial point is offset from the center of the spur gear for traveling an elliptic or eccentric pattern. The elongated rendering member includes a slidable engagement with a track pivotally coupled to a distal end of the rotating arm. A granular substance is arranged for manipulation by a guide element attached to the elongated rendering member for fixing a visual rendering of a path defined by the guide element as the guide element travels beneath a planar support surface having a layer of the granular substance, such as sand, gravel, or crushed walnuts, layered on top.

Mechanical operation is encapsulated in the enclosure beneath the support surface, where the guide element is typically a magnet and the granular substance has a magnetic follower such as a steel ball responsive to the magnet for traveling the path on top of the support surface.

The spur gear has one or more radial points disposed at varying radii from the center, such that each radial point is adapted to receive a pin defining the pivot linkage. The radial points appear as a spiral on the spur gear and each successive radial point defines a slightly larger radius for driving the elongated rendering member. The elongated rendering member has a linear shape extending parallel to the track and has a plurality of receptacles in an array, in which each receptacle is adapted to receive a guide element. The track and slide of the elongated rendering member form a telescoping arrangement as the track pivots at the distal end of the rotating arm while the elongated rendering member pivots on the spur gear. Any number of guide elements, or magnets may be placed in each of the available receptacles in the elongated rendering member for rendering multiple paths in the granular layer.

In the enclosure, the motor is disposed in the center of the circular enclosure and the granular layer resides in a circular tray in a plane just above a plane of rotation of the spur gear. Access to the mechanism and guide elements is by removal of the top granular layer where the number of guide elements and the linkages may be adjusted.

The spur gear, enclosure and related apparatus parts as depicted in the FIGS. below may be extruded or printed by a 3 dimensional printer, extrusion molded, or other suitable fabrication approach.

The description below demonstrates various features of the device in operation. FIG. 1 is a perspective view of the rotary image device as disclosed herein. Referring to FIG. 1, the rotary image device 100 includes a motor housing 110 upon which rests a rotating arm 112 driven by the motor in rotation around an enclosure 102. The rotating arm 112 supports a spur gear 120 at a proximate end concealed beneath the spur gear 120. The spur gear 120 engages an array of teeth 104 around the inner circumference of the enclosure 102. The teeth of the spur gear 120 enmesh with the array of teeth 104 for rotating the spur gear 120 as the rotating arm 112 rotates in the enclosure 102. Thus, the rotating arm 112 rotates on an axis central to the enclosure 102, and the spur gear rotates on an axis at the proximate end of the rotating arm 112 as the spur rear axis follows an inner radius around the circular enclosure 102.

The rotating arm 112 drives gear driven rotation of the spur gear 120, as an elongated rendering member 130, pivotally attached to the spur gear and a distal end of the rotating arm, disposes an array of receptacles 132 in a sliding engagement as the elongated rendering member extends and retracts. One or more of the receptacles each have a magnet defining a guide element. A steel ball or other rendering element follows the magnet when a cover and layer of sand are placed on the enclosure.

Figure 2:
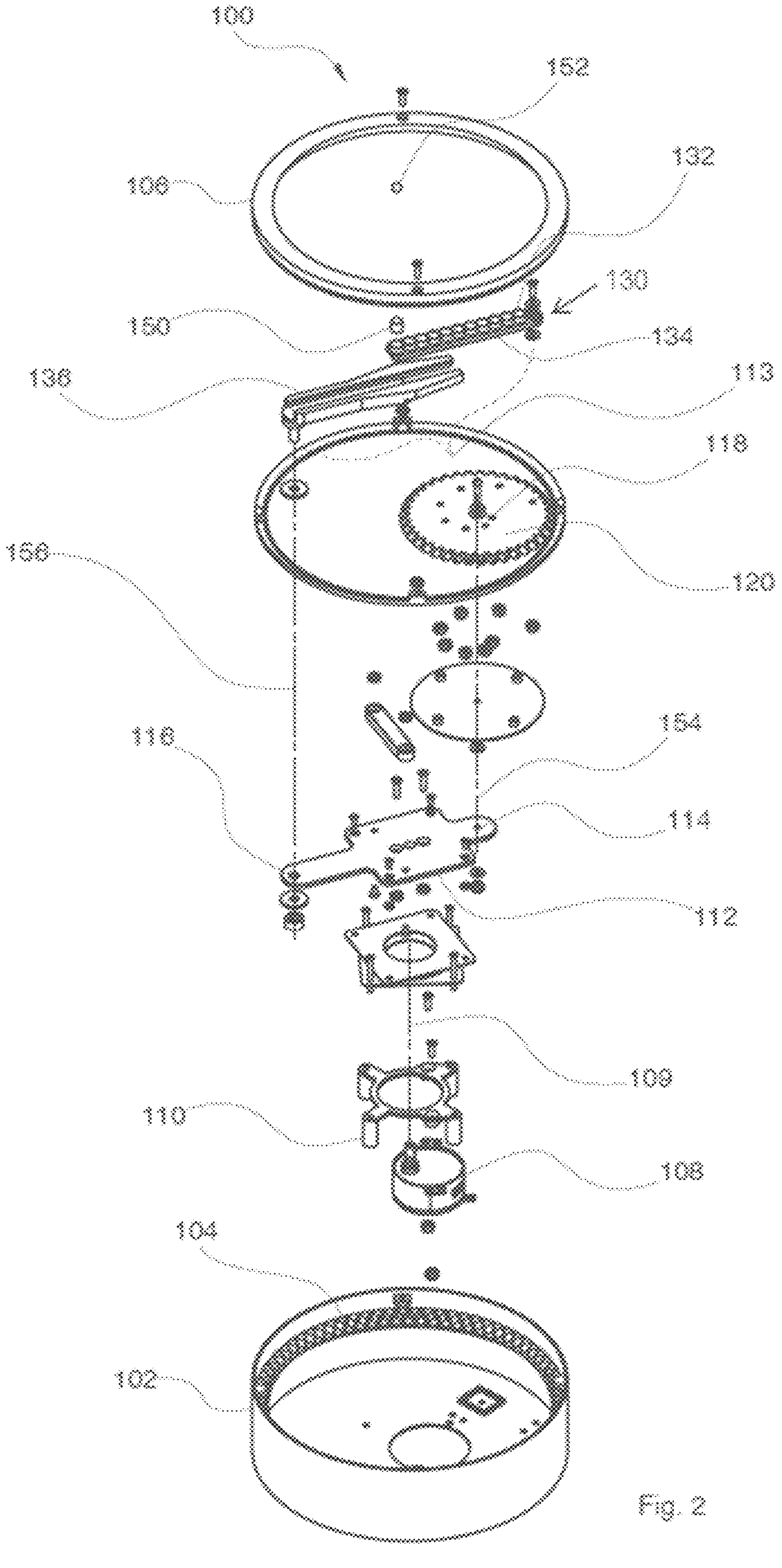
FIG. 2 is an exploded view of the rotary image device of FIG. 1.

FIG. 2 is an exploded view of the rotary image device 100 of FIG. 1. Referring to FIGS. 1 and 2, and continuing from the description of FIG. 1, the rendering device for generating a rotary pattern in a granular medium includes the rotating arm 112 having a distal end 116 and a proximate end 114, such that the distal end 116 defines an outer radius and the proximate end 114 defines an inner radius.

A motor 108 secured in the enclosure 102 attaches to the rotating arm 112 for rotation about a center axis 109, to which the spur gear 120 rotationally attaches to the proximate end 114. The elongated rendering member 130 pivotally attaches between the distal end 116 and a radial location 118 on the spur gear, such that the elongated member has a varying length based on a rotation of the spur gear 120 and the distance from this radial location 118 as the spur gear 120 rotates relative to the distal end 116. A track 136 and a slide 134 further define the elongated rendering member 130, as the track 136 is adapted to slidably receive the slide 134 for varying the length based on the rotation of the spur gear 120.

The elongated rendering element 130 has a guide element 150 disposed on the elongated rendering member, typically a magnet, such that the guide element 150 is in communication with a rendering element 152 through the cover 106 for traversing a path through a rendering medium, typically sand. An array of receptacles 132 resides on the slide 134, each of which can contain a guide element 150.

It should be noted that the elongated rendering member 130 has first and second opposed ends 156, 154, such that a pivotal attachment between the first opposed end 156 and the distal end 116 of the rotating arm 112 traverses the outer radius just inside the circumference of the enclosure 102 from rotation of the rotating arm. At the other end, a pivotal attachment secures the second opposed end 154 and the radial location 118 on the spur gear 120, as an axis of the spur gear traverses the inner radius from rotation of the rotating arm 112. The inner radius and outer radius, discussed further below, therefore form concentric circles with the enclosure 102 as the motor axis 109 defines the center through the rotating arm 112. It therefore follows that an effective length 113 of the elongated rendering member 112 varies based on an angle of rotation of the spur gear around an axis 121 defined by the rotational attachment to the rotating arm.

FIGS. 3A-3D show individual components from the exploded view of FIG. 2. Referring to FIGS. 1-3D, FIG. 3A shows the enclosure 102 with a cover 106 surface that contains the layer of sand or rendering medium. The mechanism as shown in FIG. 1 resides just beneath the cover for providing magnetic communication for a rendering element 152 placed on the cover 106.

Figure 3A:
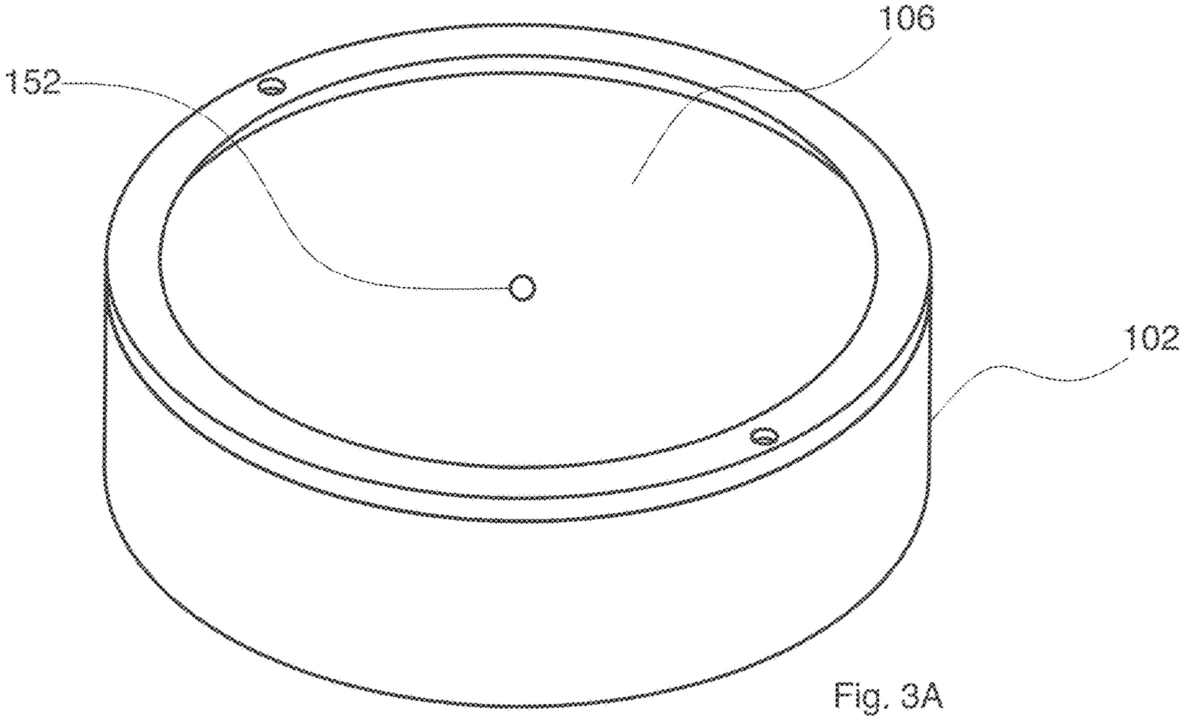
FIGS. 3A-3D show individual components from the exploded view of FIG. 2.
Figure 3B:
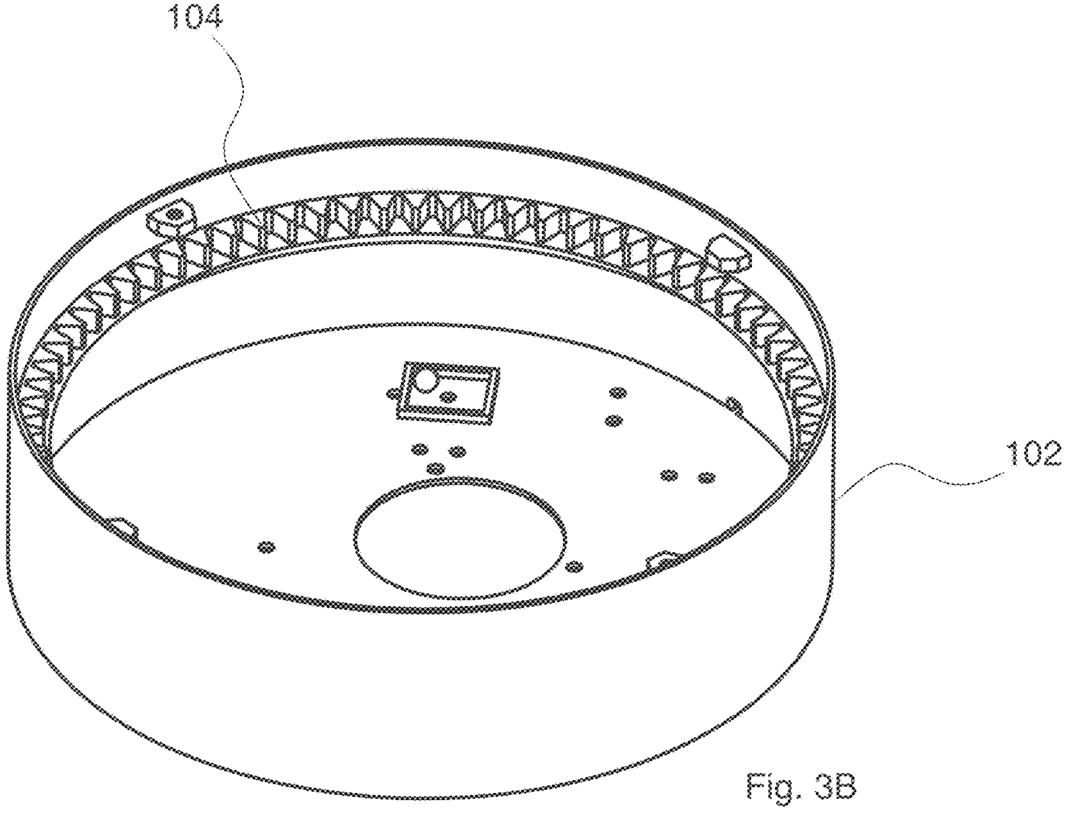

FIG. 3B shows the bare enclosure 102 that supports the cover 106 and houses the mechanism and the array of teeth 104. The circular housing has a number of teeth based on a fractional multiple of a number of teeth on the spur gear 120, such that a given radial location on the spur gear shifts at least one gear tooth position for each rotation of the rotating arm. If the spur gear had an even (integer) multiple of the array 104, then the guide element 150 would follow the same path at each rotation of the rotating arm; a fractional multiple maintains the spur gear at a different phase to ensure a slightly different path each rotation.

Figure 3C:
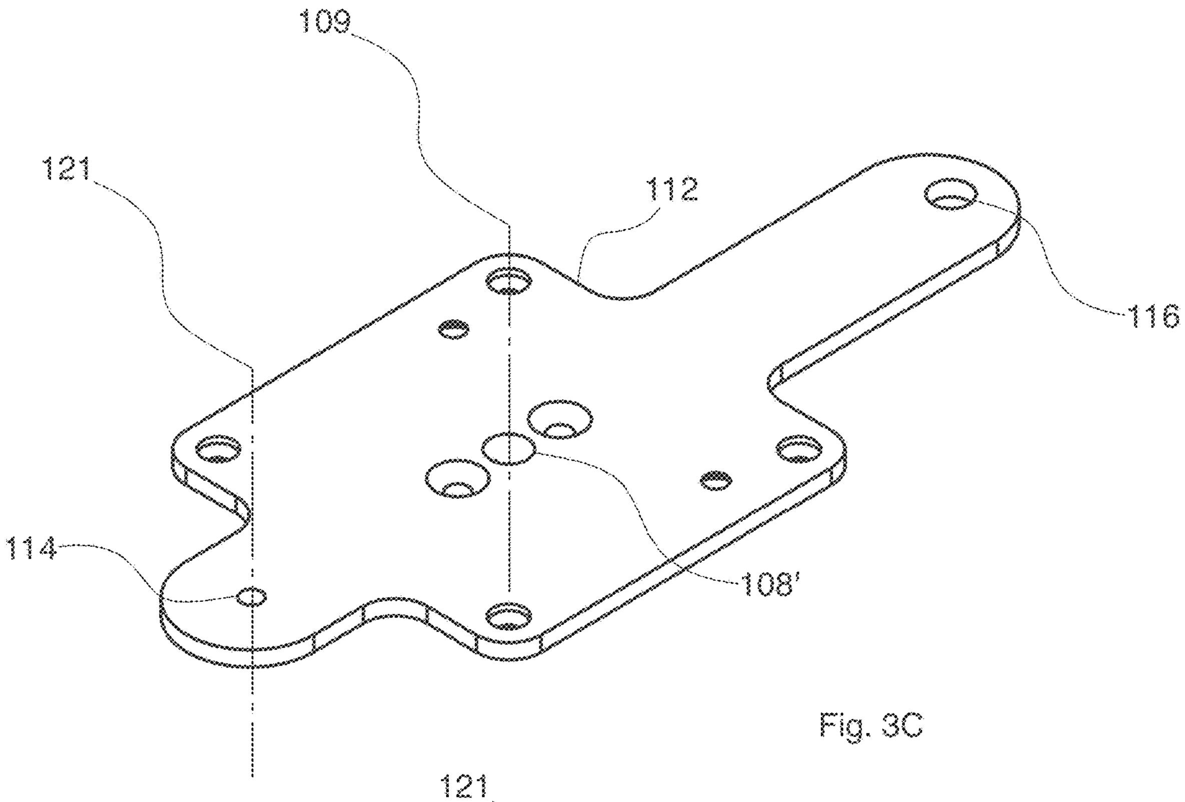

FIG. 3C shows the rotating arm 112. The motor 108 aligns with shaft hole 108' and defines the motor axis 109. The distal end 116 provides a pivot for the elongated rendering member 130 at end 156, and the proximate end 114 defines the axis 121 for the spur gear 120.

Figure 3D:
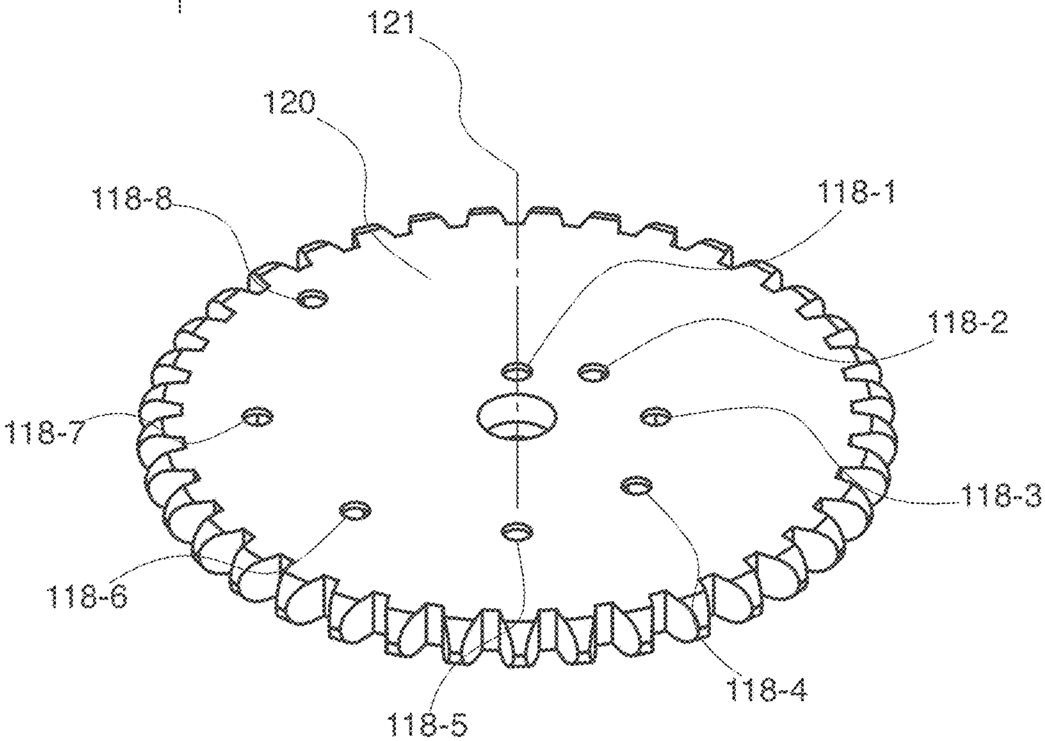

FIG. 3D shows the spur gear 120 and one or more radial attachment points 118-1 . . . 118-8 (118 generally) for engaging the elongated rendering member 130. The elongated rendering member 130 may attach to any of the radial attachment points at opposed end 154; alternatively, a similar effect results from altering a position of the receptacle positions of the guide element 150 in the receptacle array 132. Certain configurations need only a single radial attachment point 118, for simplicity.

Figure 4A:
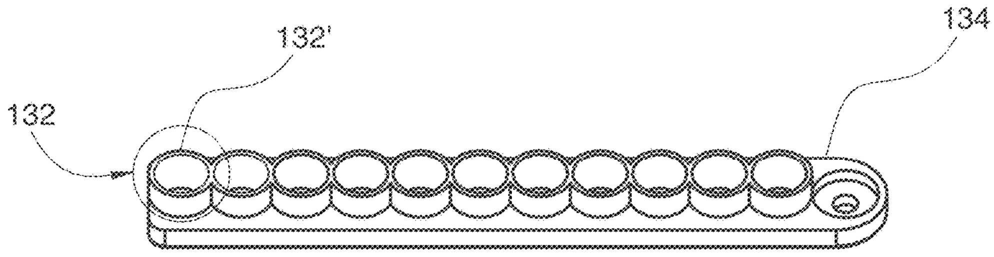
FIGS. 4A-4C show the variable length components of the elongated rendering member as in FIGS. 1-3D.
Figure 4B:
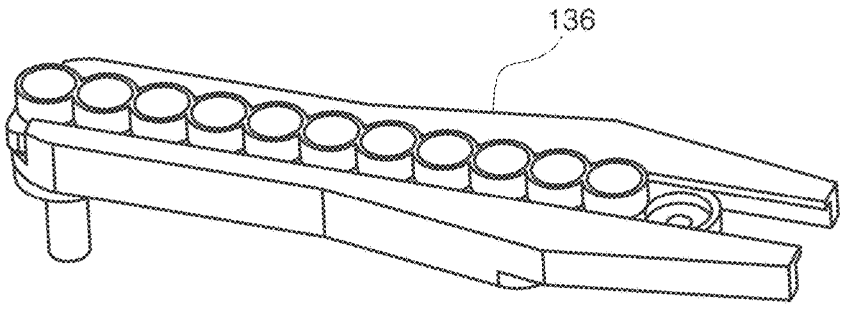
Figure 4C:
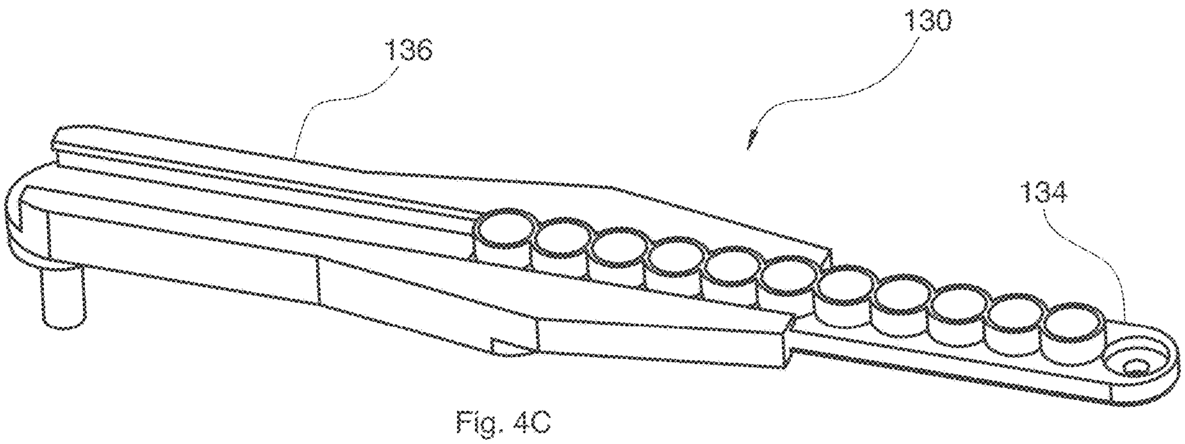

FIGS. 4A-4C show the variable length components of the elongated rendering member as in FIGS. 1-3D. Referring to FIGS. 1 and 4A-4C, the elongated rendering member 130 includes a slide 134 and a track 136. The slide 134 has an array 132 of one or more receptacles 132' for receiving one or more respective guide elements 150. Slidable engagement as the slide 134 is received into the track 136 defines the elongated rendering member 130 that extends and retracts as the spur gear 120 rotates, along with the attachment point 118 for varying the distance from the distal end 116 where the track 136 attaches. Each guide element 150 is therefore disposed in a receptacle 132' of a plurality of receptacles on the elongated rendering member 130, where each receptacle is adapted to retain a guide element. Alternatively, receptacles could be disposed on the track 136, for imposing a fixed distance from the distal end 116 to the guide element 150.

Figure 5B:
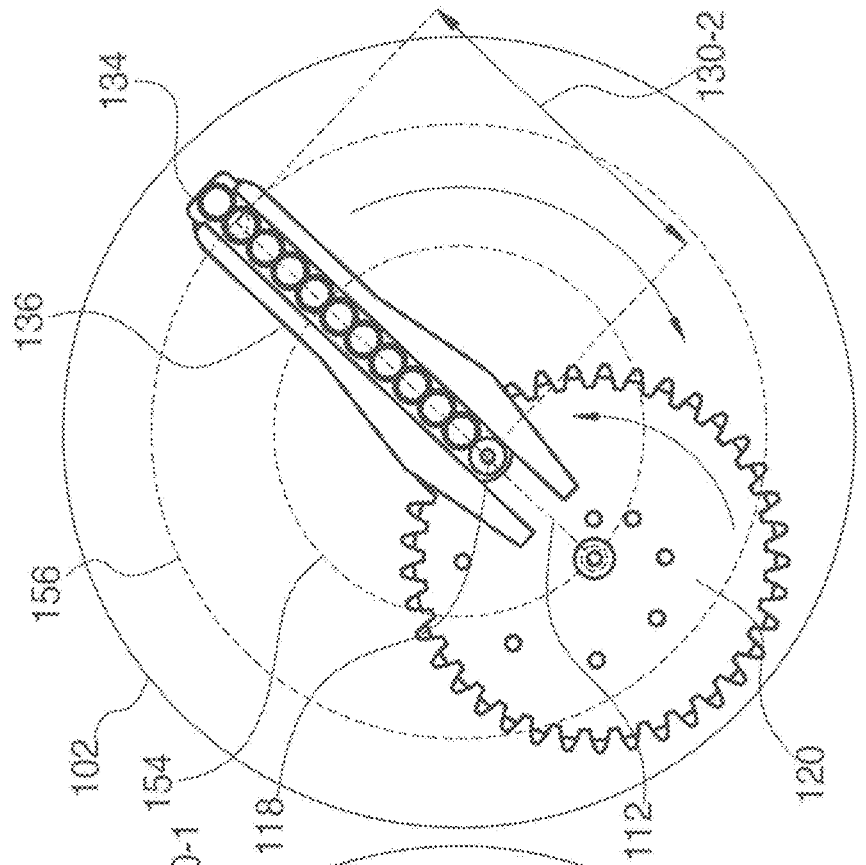
FIGS. 5A-5D show varying increments of rotation of the device of FIGS. 1-4C.
Figure 5A:
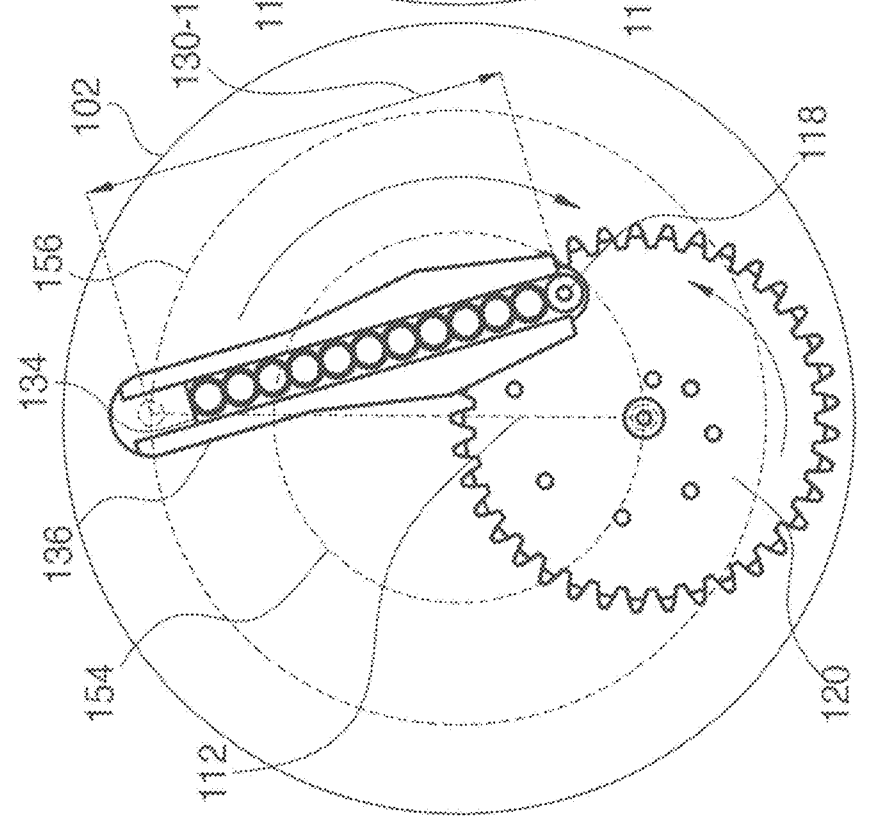

FIGS. 5A-5D show varying increments of rotation of the device of FIGS. 1-4C. Referring to FIGS. 1, 2 and 5A-5D, a schematic arrangement in FIGS. 5A-5D shows the varied length of the elongated rendering element 130, as it pivots on the distal end 116 and the attachment point 118 of the spur gear 120, from rotation against the enclosure teeth 104. FIG. 5A shows the spur gear 120 as the attachment point 118 approaches a shortest length 130-1. The pivot at the distal end 116 defines the outer radius 156, and the spur gear 120 axis 121 at the proximate end 114 defines the inner radius 154.

Figure 5D:
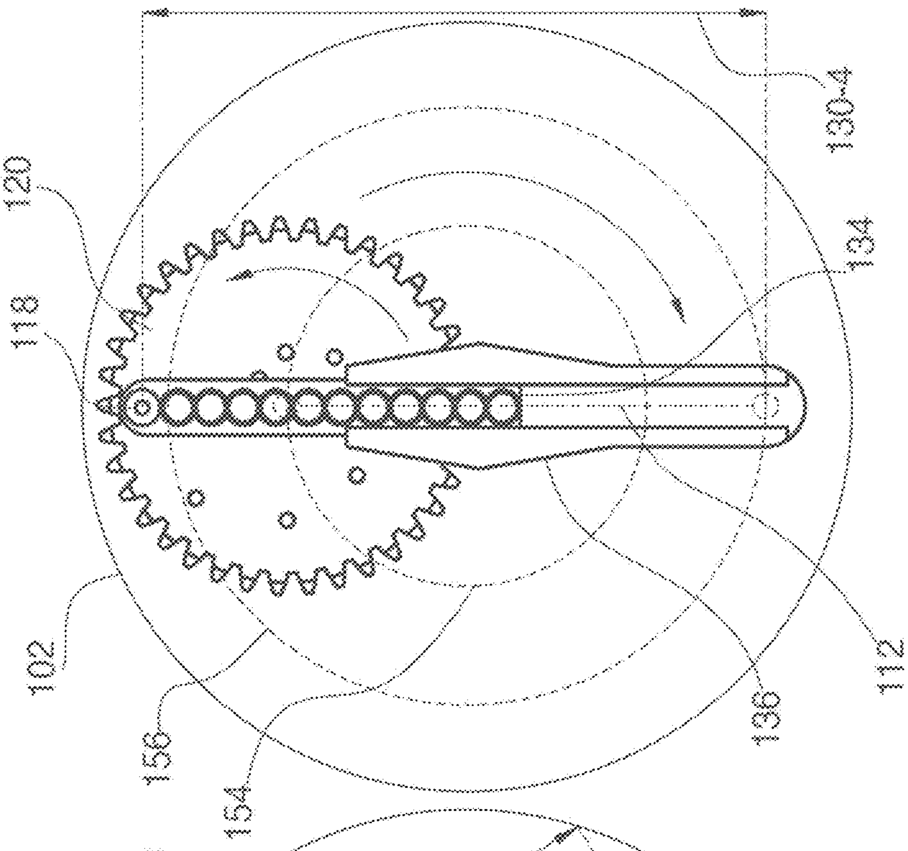
Figure 5C:
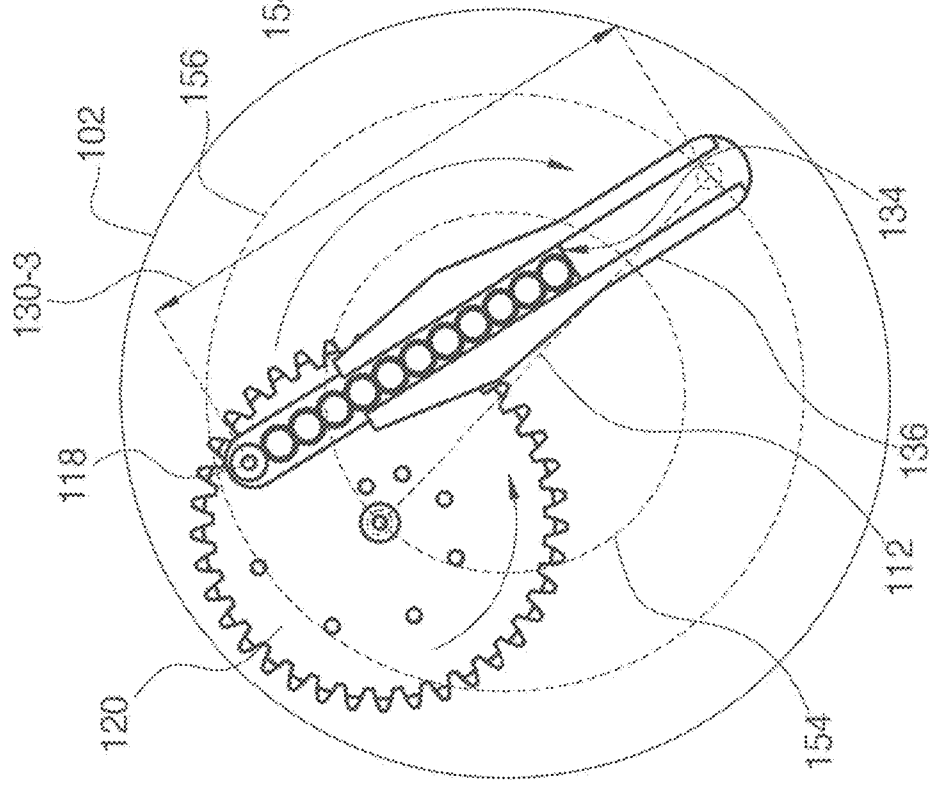

FIG. 5B shows the elongated rendering element 130 at the shortest length 130-2, characterized by the attachment point 118 passing over the rotating arm 112, characterized by the slide 132 at a fullest insertion in the track 134. In FIG. 5C, the spur gear 120 draws the slide 132 outward to length 130-3, approaching the greatest length 130-4 of the elongated rendering member 130, as shown in FIG. 5D.

It should be further noted that the movement of the guide element 150 drives the rendering element 152 through the layer of sand immediately above the mechanism for forming the rotary image, varying at each iteration of the rotating arm 112 as the spur gear achieves a fractional rotation at each full pass around the enclosure teeth 104.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A rendering device for a rotary pattern in a granular medium, comprising:

a rotating arm having a distal end and a proximate end, the distal end defining an outer radius and the proximate end defining an inner radius;

a motor attached to the rotating arm for rotation about a center axis;

a spur gear rotationally attached to the proximate end;

an elongated rendering member pivotally attached between the distal end and a radial location on the spur gear, the elongated member having a varying length based on a rotation of the spur gear and a plurality of receptacles; and a guide element disposed on the elongated rendering member, the guide element in communication with a rendering element for traversing a path through a rendering medium the guide element is disposed in a receptacle of the plurality of receptacles on the elongated rendering member, each receptacle of the plurality of receptacles adapted to retain the guide element.

2. The device of claim 1 further comprising a circular housing, the circular housing having an array of teeth adapted for engagement with the spur gear, the spur gear driven for rotation from rotational attachment to the rotating arm.

3. The device of claim 2 wherein the circular housing has a number of teeth based on a fractional multiple of a number of teeth on the spur gear, a radial location on the spur gear shifting at least one gear tooth position for each rotation of the rotating arm.

4. The device of claim 2 wherein the housing has a non-integer multiple of teeth of the number of teeth on the spur gear.

5. The device of claim 1 wherein the elongated rendering member has first and second opposed ends, further comprising:

a pivotal attachment between the first opposed end and the distal end of the rotating arm, the pivotal attachment traversing the outer radius from rotation of the rotating arm; and a pivotal attachment between the second opposed end and the radial location on the spur gear, an axis of the spur gear traversing the inner radius from rotation of the rotating arm.

6. The device of claim 5 wherein the spur gear has a plurality of mounting positions, each mounting position of the plurality of mounting positions disposed at a different radius and adapted for pivotal engagement with the second opposed end of the elongated rendering member.

7. The device of claim 1 wherein the length of the elongated rendering member has a length that varies based on an angle of rotation of the spur gear around an axis defined by the rotational attachment to the rotating arm.

8. The device of claim 7 wherein the elongated rendering member has a track and a slide, the track adapted to slidably receive the slide for varying the length based on the rotation of the spur gear.

9. The device of claim 1 further comprising:

a rendering surface, the rendering surface suspended adjacent and above the elongated rendering member;

a rendering medium layer deposited on the rendering surface; and the rendering element disposed on the rendering surface and responsive to the guide element for being drawn through the rendering medium layer for agitating the rendering medium for forming a visible pattern.

10. The device of claim 9 wherein the guide element and the rendering element are in magnetic communication and the rendering medium is a granular stock responsive to displacement from the drawn rendering element.

11. A rotationally driven rendering device for displacing a granular substance in a cyclic rotary path, comprising:

a circular enclosure having a series of perimeter teeth around a circumference and a motor;

a rotating arm rotationally driven by the motor;

a spur gear rotationally attached to a proximate end of the rotating arm at a center of the spur gear, the spur gear adapted to engage the perimeter teeth;

a pivot linkage pivotally engaged with an elongated rendering member at a radial point on the spur gear, the radial point offset from the center of the spur gear, the elongated rendering member in a slidable engagement with a track, the track pivotally coupled to a distal end of the rotating arm; and a granular substance arranged for manipulation by a rendering element in communication with a guide element attached to the elongated rendering member for fixing a visual rendering of a path traveled by the rendering element, the elongated rendering member having an elongated shape extending parallel to the track and having a plurality of receptacles in a linear arrangement, each receptacle adapted to receive the guide element.

12. The device of claim 11 wherein the spur gear has a plurality of radial points disposed at varying radii from the center, each radial point adapted to receive a pin defining the pivot linkage.

13. The device of claim 11 wherein the guide element is a magnet and the granular substance surrounds the rendering element responsive to the magnet for traveling the path.

14. The device of claim 11 wherein the motor is disposed in the center of the circular enclosure and the granular substance further comprises a circular tray in a plane parallel to a plane of rotation of the spur gear.

* * * * *